United States Patent [19]

Stahlheber

[11] 3,723,602

[45] Mar. 27, 1973

[54] PHOSPHATE COMPOSITIONS AND METHODS OF MANUFACTURE

[75] Inventor: Norman Earl Stahlheber, Columbia, Ill.

[73] Assignee: Monsanto Company, St. Louis, Mo.

[22] Filed: Mar. 8, 1971

[21] Appl. No.: 122,115

Related U.S. Application Data

[63] Continuation of Ser. No. 729,384, May 15, 1968, abandoned.

[52] U.S. Cl. .......................423/305, 71/34, 71/43
[51] Int. Cl. .........................C01b 15/16, C01b 25/26
[58] Field of Search.........23/106, 106 A, 107; 71/43, 71/34; 423/304–316

[56] References Cited

UNITED STATES PATENTS

| | | | |
|---|---|---|---|
| 2,988,439 | 6/1961 | Gloss | 23/106 X |
| 3,132,020 | 5/1964 | Tesche et al. | 71/34 |
| 3,347,656 | 10/1967 | Potts et al. | 23/107 X |
| 3,554,729 | 1/1971 | Curless | 23/107 X |
| 2,867,504 | 1/1959 | Semmens | 23/106 |

*Primary Examiner*—Oscar R. Vertiz
*Assistant Examiner*—Gregory A. Heller
*Attorney*—Herbert B. Roberts, Roger R. Jones and Neal E. Willis

[57] ABSTRACT

A novel crystalline potassium polyphosphate hydrate and a method for its manufacture are disclosed. The new polyphosphate is useful in compounding slowly soluble fertilizer compositions.

7 Claims, No Drawings

PHOSPHATE COMPOSITIONS AND METHODS OF MANUFACTURE

This application is a continuation of U.S. application Ser. No. 729,384, filed May 15, 1968, now abandoned.

This invention relates to a novel potassium polyphosphate hydrate and methods for its manufacture.

Most potassium-containing compounds generally used as fertilizers are very soluble in water. When applied to the soil, much of the nutritive value of these salts is lost due to leaching into rain water and removal from the desired location.

A desirable form of potassium would be a relatively water-insoluble salt, which would release its potassium ion at a relatively slow and controlled rate, for example, a rate which increases with increasing soil temperature. One such compound has long been known to exist, a potassium phosphate salt known as potassium Kurrol's salt having the empirical formula, $KPO_3$. Although potassium Kurrol's salt has the above-mentioned desirable characteristics, its use in fertilizers has been minimal, due to difficulties encountered in preparing the material. For example, a typical method of preparation requires the stepwise manufacture of a relatively pure form of monopotassium dihydrogen orthophosphate by a crystallization process, using relatively expensive potassium hydroxide solution and orthophosphoric acid. Thereafter, the crystallized orthophosphate is thermally condensed, or dehydrated, to remove all water at temperatures above about 300° C and milled to the desired particle size. The milling step is a difficult operation, since the potassium Kurrol's salt is a tough, fibrous material which resists attrition. It is believed, therefore, that a potassium-containing material which is slowly soluble in water and which is relatively easy to prepare in readily usable form would be an advancement in the art.

In accordance with this invention it has been discovered that a novel slowly soluble potassium polyphosphate having the formula $$K_{n+2}P_nO_{3n+1} \cdot nH_2O$$

wherein $n$ is an integer having an average value greater than 10 is prepared by (a) forming a reaction mixture by adding in any order; substantially water-insoluble ammonium polyphosphate, water and a water-soluble inorganic potassium salt or potassium hydroxide, and maintaining said reaction mixture under reaction conditions for a time sufficient to form the slowly soluble crystalline hydrated potassium polyphosphate. The novel potassium polyphosphate hydrate has the following unique X-ray diffraction pattern:

TABLE I

| Diffraction Angle, $2\theta$ | Interplanar Distance, d | Peak Intensity $I/I_\circ \times 100$ |
|---|---|---|
| 13.75 | 6.435 | 90 |
| 21.45 | 3.630 | 40 |
| 24.5 | 3.630 | 40 |
| 25.7 | 3.45 | 30 |
| 26.9 | 3.31 | 10 |
| 27.6 | 3.23 | 25 |
| 29.1 | 3.07 | 95 |
| 32.2 | 2.86 | 100 |
| 35.2 | 2.55 | 10 |
| 36.8 | 2.44 | 15 |
| 40.6 | 2.22 | 5 |
| 41.4 | 2.18 | 10 |
| 42.5 | 2.13 | 5 |
| 42.9 | 2.11 | 10 |
| 43.4 | 2.08 | 15 |
| 43.8 | 2.065 | 20 |
| 44.5 | 2.034 | 10 |
| 48.5 | 1.875 | 10 |
| 53.6 | 1.708 | 10 |

Evidence that the substrate is a hydrate, instead of an anhydrous potassium salt, is substantiated by differential thermal analysis and by thermogravimetric analysis, which show that the amount of bound water corresponds to n mols of water in the empirical formula for potassium polyphosphate $K_{n+2}P_nO_{3n+1}$, where n is a number greater than about 10. The percent by weight of bound water normally is about 14 percent by weight.

When the potassium polyphosphate of the instant invention and the ammonium polyphosphates used as raw materials are characterized herein as being substantially water-insoluble or slowly soluble, it is intended to mean that the solubility of a slurry of 10 grams of solids/100 cc of water after 60 minutes at 25° C is about 5 grams/100 cc of water or less. Specifically, for purposes of the present invention a potassium or ammonium polyphosphate having a solubility of a specified value refers to the solubility value in grams per 100 cc of water when 10 grams of the polyphosphate are slurried in 100 cc of water for 60 minutes at 25° C.

The degree of polymerization of the slowly soluble potassium polyphosphate hydrate of the present invention is difficult to determine since known methods for determining such are so-called "solution methods", that is, solutions techniques are employed to determine the degree of polymerization. For example, as determined by the end group titration method [Van Wazer, Griffith and McCullough, Anal. Chem., 26, 1755 (1954)] after converting the polyphosphates to the acid form by ion exchange resins [Van Wazer and Holst, J. Am. Chem. Soc., 72, 639 (1950)], the average numerical value of $n$ is from about 20 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the average weight value of $n$ is from about 500 to about 100,000.

In general, any water-soluble inorganic potassium salt or potassium hydroxide can be used which will mix with water to yield a potassium ion. By water-soluble it is meant that at least about 5 grams of the potassium-containing material will dissolve in 100 cc of water at 60° F. In most instances, potassium salts of inorganic acids such as potassium chloride, potassium sulfate, potassium nitrate, potassium carbonate, the various potassium phosphates and potassium hydroxide will be preferred since these compounds are relatively water-soluble. Each has value in certain applications related to cost, ease of operation, assay control and other considerations which will be apparent to persons skilled in the art of fertilizer manufacture.

Although the novel potassium phosphate hydrate has been prepared in substantially pure form by treating an aqueous slurry of insoluble ammonium polyphosphate with potassium hydroxide solution and removing the ammonium ion by evaporation as gaseous ammonia, this degree of purity is not always required for fertilizer application.

Generally all that is required to produce the relative water-insoluble potassium polyphosphate hydrate is to form a mixture of a water-soluble potassium salt or potassium hydroxide and any of the various crystalline forms of ammonium polyphosphate, then add sufficient water to moisten the mixture, and then to dry the mixture after a suitable tempering or ion exchange period. Under some conditions, it is only necessary to add enough water to form the hydrate, that is, one mole of water per mole of potassium to produce a desired granular product containing the hydrated potassium polyphosphate salt. Generally, however, it is preferred on a weight basis to add at least about 5 parts of water per 100 parts of the total mixture, preferably from at least about 10 parts to about 20 parts of water per 100 parts of the total mixture. Additionally, it is preferred that the molar ratio of potassium to water be from about 1:1 to about 1:5. Larger amounts of water can be used with a resulting decrease in the time necessary to form the slowly soluble hydrated potassium salt; however, a corresponding increase in the drying load results. In most instances material relatively free of free water will be desired. The time required to complete a suitable degree of ion exchange will be from about 3 minutes to about 10 hours, depending upon the particle size of the ammonium polyphosphate, the type and form of potassium source used, the amount of water used, the temperature of the mixture and other physical characteristics.

The proportion of water-soluble potassium-containing material to ammonium polyphosphate can be varied as desired to produce a fertilizer material having the desired ratio of N-P-K. In addition, other components can be added to the mixture, such as urea, which will increase the proportion of nitrogen to potassium and phosphorus, although the ratio of slowly available potassium will depend upon the ratio of water-soluble potassium-containing product and ammonium polyphosphate, and the extent to which the reaction between the two is allowed to approach completion. Preferred compositions contain a nitrogen to potassium ratio of from about 1:10 to about 10:1, and wherein the percent of ammonium polyphosphate converted to potassium polyphosphate hydrate is from about 20 percent to about 100 percent based upon the amount of potassium present in the reaction mixture.

A preferred method of fertilizer preparation embodying this invention is to spray a slurry of potassium carbonate onto a tumbling bed containing ammonium polyphosphate and subsequently drying the resulting product. Ammonium carbonate is evolved and can be recovered for its valuable nitrogen content. The advantage of this type of operation is that a highly desirable granular form of fertilizer is prepared of which a substantial proportion is in a slowly available ammonium, potassium and phosphorus form. If desired, the ammonium carbonate recovery can be accomplished by feeding it as a raw material into a urea manufacturing plant.

Many other desirable approaches will be suggested to others skilled in the art of fertilizer manufacture. For example, completely formulated fertilizer compositions having a wide range of N-K-P ratios can be prepared. Also other plant nutrients can be included in the formulation either in the solution phase or in the solid bed phase. Examples of such added plant nutrients are copper, molybdenum, sulfur, iron and readily-available nitrogen, such as urea, ammonium nitrate and the like.

The ammonium polyphosphates which are useful in preparing the novel potassium polyphosphate composition of this invention can be represented by the formula

wherein $n$ is an integer having an average value greater than 10 and $m/n$ is between about 0.95 and about 1.1 and the maximum value of m is equal to $n+2$. The average value of n being greater than 10 is evidenced by the paper chromatograph method [Karl-Kroupa, Anal. Chem., 28, 1091 (1956)], and the polymeric P-O-P type linkage is evidenced by n.m.r. spectra which indicates substantially no P-N-P type linkages and no ortho, pyro or short chain P-O-P type groups and by infra-red spectra which indicates P-O-P type linkages but does not indicate substantially any P-N type linkages.

These polymeric ammonium polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates useful for preparing the potassium polyphosphates of this invention is about 1, i.e., with $m = n+2$ when the polyphosphates are completely ammoniated and the chain length is large such as above 200, in some cases the molar ratio of ammoniacal nitrogen to phosphorus is less than 1 and these partially ammoniated materials are satisfactory as long as the molar ratio of $NH_4$ to phosphorus is not less than about 0.95.

The ammonium polyphosphates useful for preparing the compounds of the present invention can be prepared exhibiting many different crystalline forms as evidenced by their X-ray diffraction patterns and, in general, any of such forms can be used (although Forms 1 and 2, infra, are preferred), as well as the non-crystalline or amorphous form. Crystalline forms ullustrative of ammonium polyphosphates suitable for use include the following:

X-RAY DIFFRACTION DATA [a]

| Form 1 (b) | | Form 2 (b) | | Form 3 (b) | Form 4 (b) | |
|---|---|---|---|---|---|---|
| Line | d,A. | Line | d,A. | d,A. | Line | d,A. |
| 1 | 6.06 | 1 | 5.701 | 6.65 | 1 | 5.70 |
| 2 | 5.47 | 2 | 6.062 | 5.68 | 2 | 5.60 |
| 3 | 3.83 | 3 | 3.083 | 5.40 | 3 | 3.42 |
| 4 | 3.50 | 4 | 2.934 | 3.52 | 4 | 7.00 |
| 5 | 3.24 | 5 | 3.375 | 3.80 | 5 | 6.10 |

(a) CuK α Radiation
(b) Five strongest lines in order of decreasing intensity

Although larger particle size of ammonium polyphosphate can be used, ammonium polyphosphate having a particle size fine enough to pass through an 8 mesh screen (USSS) are preferred, with a particle size at least fine enough to pass through a 20 mesh screen being especially preferred.

The substantially water-insoluble ammonium polyphosphates useful for preparing the potassium polyphosphates of the present invention can be prepared by many and various methods such as the methods disclosed and described in copending application Ser. No. 301,918, filed Aug. 13, 1963, and in copending application Ser. No. 420,459, filed Dec. 22, 1964, now U.S. Pat. No. 3,397,035 granted Aug. 13, 1968. In general, a phosphate containing material, such as monoammonium orthophosphate, diammonium orthophosphate, condensed phosphoric acid, orthophosphoric acid and the like, is thermally condensed with an ammoniating and condensing agent such as urea, ammonium carbonate, biuret, sulfamide, sulfamic acid, ammonium sulfamate, guanyl urea, methyl urea, formamide, amino urea, 1-3-diamino urea, biurea and the like. In particular, for example, monoammonium orthophosphate and urea can be thermally condensed to prepare substantially water-insoluble ammonium polyphosphates by heat treating a melt formed from substantially equimolar quantities at a temperature of about 250° C for a period of about 3 hours.

To more fully illustrate the invention, the following examples are presented. All parts, percentages and proportions are by weight unless other indicated.

EXAMPLE 1

One hundred grams of ammonium polyphosphate are slurried in 50 parts of water at 25° C. To the foregoing slurry about 130 parts of a 45 percent potassium hydroxide solution are slowly added with agitation, accompanied by a copious evolution of ammonia from the slurry. A stream of nitrogen gas is bubbled into the slurry until there is an absence of an odor of ammonia.

The reaction medium is filtered, washed with distilled water and then with acetone, and the solid residue is dried. Chemical analysis shows the following approximate composition:

| | |
|---|---|
| $P_2O_5$ | 52% |
| $K_2O$ | 34% |
| $H_2O$ | 14% |
| N | <1% | the X-ray diffraction pattern of a sample of the product is as shown in Table I. Differential thermoanalysis and thermogravimetric analysis of a sample of the product show that water is removed at 125° C instead of at 100° C for free water indicating a hydrate. Solubility in water is measured as less than 0.1 g/100 cc at 25° C. Essentially all of the $P_2O_5$ content is available to the plant food as measured by the A.O.A.C. standard method which uses the citrate solubility method.

A sample of the product was ignited at 600° C to remove volatile matter, then cooled to room temperature. The ignited product is identified by X-ray diffraction as having a pattern similar to potassium Kurrol's salt.

EXAMPLE 2

Five hundred parts of ammonium polyphosphate are blended with 385 parts of potassium chloride. Two hundred grams of water are added and blended into the mixture of salts. The damp mixture is heated for two hours at 85° C, then dried in a forced draft oven. Analysis shows that the product is a mixture of the potassium polyphosphate as obtained in Example 1, ammonium polyphosphate, ammonia and residual potassium chlorides.

EXAMPLE 3

A slurry containing 300 parts potassium carbonate and 117 parts water is sprayed onto a tumbling bed containing 420 parts of powdered ammonium polyphosphate in a rotary drum. Spraying time is about 3 minutes. The product assumes a granular appearance as ammonia is evolved. After drying at about 50° C the product is found to contain 1 percent residual ammonia. The particle size distribution is about 95 percent between 6 mesh and 40 mesh U.S.S. sieve series. Analysis of the product shows substantially the same proportions of $P_2O_5$, $K_2O$, $H_2O$ and N as in Example 1 and structurally a polyphosphate.

What is claimed is:

1. A slowly soluble crystalline potassium polyphosphate hydrate of the formula $$K_{n+2}P_nO_{3n+1} \cdot nH_2O$$

wherein $n$ is an integer greater than 10, said crystalline polyphosphate being characterized by the following unique X-ray diffraction pattern:

| Diffraction Angle, $2\theta$ | Interplanar Distance, d | Peak Intensity $I/I_1 \times 100$ |
|---|---|---|
| 13.75 | 6.435 | 90 |
| 21.45 | 3.630 | 40 |
| 24.5 | 3.630 | 40 |
| 25.7 | 3.45 | 30 |
| 26.9 | 3.31 | 10 |
| 27.6 | 3.23 | 25 |
| 29.1 | 3.07 | 95 |
| 32.2 | 2.86 | 100 |
| 35.2 | 2.55 | 10 |
| 36.8 | 2.44 | 15 |
| 40.6 | 2.22 | 5 |
| 41.4 | 2.18 | 10 |
| 42.5 | 2.13 | 5 |
| 42.9 | 2.11 | 10 |
| 43.4 | 2.08 | 15 |
| 43.8 | 2.065 | 20 |
| 44.5 | 2.034 | 10 |
| 48.5 | 1.875 | 10 |
| 53.6 | 1.708 | 10 |

2. A process for producing the slowly soluble crystalline potassium polyphosphate hydrate of claim 1 which process comprises (a) forming a reaction mixture comprising water, substantially water-insoluble ammonium polyphosphate of the formula $H_{(n-m)+2}(NH_4)_m P_n O_{3n+1}$ wherein n is an integer having an average value greater than 10 and $m/n$ is between about 0.95 and about 1.1 and the maximum value of m is equal to n+2 and a potassium source selected from the group consisting of potassium chloride, potassium sulfate, potassium nitrate, potassium carbonate, potassium phosphates, potassium hydroxide and mixtures thereof and (b) maintaining reaction conditions for a time sufficient to form said potassium polyphosphate hydrate, the amount of water being sufficient to yield a potassium to water mole ratio of from about 1:1 to about 1:5 and being from at least about 5 parts per 100 parts of the total mixture on a weight basis.

3. A process according to claim 2 wherein said potassium source is potassium chloride.

4. A process according to claim 2 wherein said potassium source is potassium carbonate.

5. A process according to claim 2 wherein the potassium to nitrogen atomic ratio is from about 1:10 to about 10:1 and wherein the percent of the ammonium polyphosphate converted to potassium polyphosphate hydrate is from about 20 percent to about 100 percent based upon the amount of potassium present in the reaction mixture.

6. A process according to claim 5 wherein said potassium source is potassium hydroxide.

7. A process according to claim 5 wherein said potassium source is potassium chloride.

* * * * *